Dec. 3, 1968   G. STEINER   3,413,957
APPARATUS FOR CONDITIONING AND GATHERING LIVE FISH FOOD
Filed Oct. 12, 1966
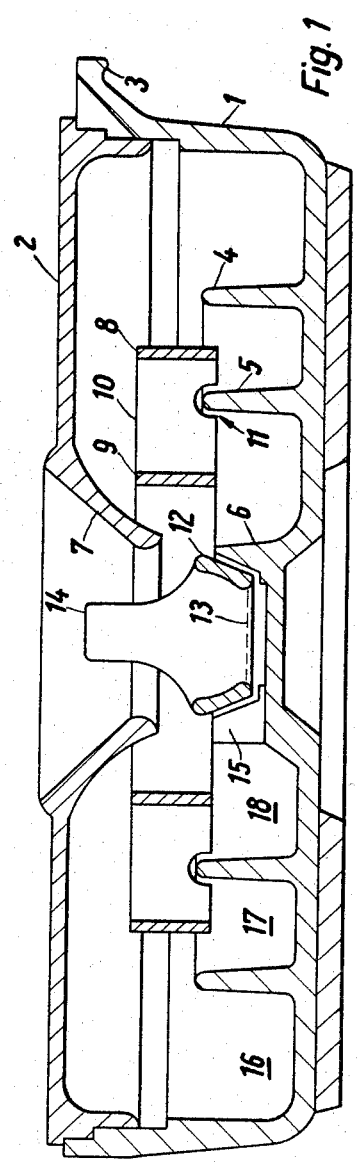
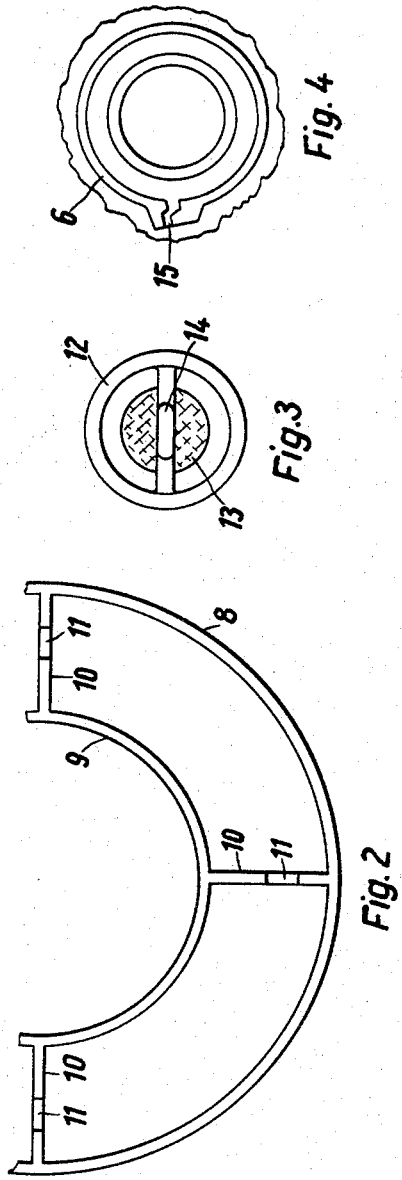
Inventor:
GEROLF STEINER
BY:- Jacob L. Kollin
ATTORNEY.

3,413,957
APPARATUS FOR CONDITIONING AND
GATHERING LIVE FISH FOOD
Gerolf Steiner, 3 Guterbergstrasse, Heidelberg, Germany
Filed Oct. 12, 1966, Ser. No. 586,141
Claims priority, application Germany, Jan. 26, 1966,
H 58,343
7 Claims. (Cl. 119—3)

The present invention concerns an apparatus for concentrating live fish food. Young fish are often fed with newly hatched larva of marine creatures of the name "Nauplius." The eggs of such Nauplia may be stored and remain germinable for many months. In sea water the hatched larva can live and mature. In fresh water, however, they become weak after about one hour, and sink to the bottom and die after a further two or three hours. For this reason only as many Nauplia are put in fresh water aquaria as can be eaten within an hour. It is thus necessary in practice for Nauplia egg shells to be prevented from getting into the aquarium and for the Nauplia to be washed in fresh water before being fed to the fish.

The object of the invention is to provide an apparatus for the separation of hatched Nauplia from the egg shells and to facilitate the washing of the Nauplia before feeding. Thus the natural instinct of the Nauplia to strive for the light is utilized.

An apparatus in accordance with the invention for concentrating live fish food comprises a container adapted to be partly filled with water and provided with a detachable cover having an opening therein, the container and cover each being made of a light impermeable material and the container being internally divided into sections by partitions and immersion walls such that, when the cover is in position on the container, the opening in the cover is positioned above a section of the container which is required to receive light through said opening and which is separated from the remaining sections by the partitions and immersion walls. In use, this container is filled with water to such an extent that the water surface is higher than the upper edges of the partitions and the lower edges of the immersion walls are immersed in the water. The eggs of the Nauplia are then charged in the darkened section of the container. When the Nauplia hatch out, they gravitate below the water surface towards the light section of the container located below the opening in the cover, but the egg shells remain in the section in which they were originally charged. The Nauplia intended for feeding which collect at this light spot may be removed through the opening in the cover. Since the Nauplia do not hatch out simultaneously, charging the apparatus once provides a continuous supply of fish food for about two days. Furthermore, only lively Nauplia are used as food since the weaklings do not find their way to the light spot at all.

The immersion walls are preferably so arranged that they separate the water surface below the cover opening from the remaining areas of the water surface. This prevents any particles accidentally drifting on the surface from arriving below the cover opening.

To permit the Nauplia to be conveniently removed and to be washed before using them as food a removable sieve insert is expediently provided below the cover opening, in which the Nauplia collect. The sieve insert is conveniently provided with a handle and the container with a pouring lip.

To ensure that only the healthiest Nauplia reach the portion of the container bottom in which the sieve insert is placed, this portion may be surrounded by a partition and may communicate with its surrounding only by way of an angled slot passing through the partition.

A particularly convenient mounting of the immersion walls is obtained by having these walls removable as a unit and inter-connected by ribs which have cut-outs for egagement with one of the partitions in order to locate the immersion walls relative to the partitions.

A particularly convenient and space saving embodiment of the invention consists in that the container and its cover are circular and the partitions and immersion walls are all arranged concentrically around the opening which is centrally arranged in the cover. In such an arrangement the eggs are placed in the outer annular section of the container and the Nauplia drift towards the centre and into the sieve insert.

The invention will now be described further, by way of example, with reference to the accompanying drawings, in which:

FIG. 1 is a medial section through a preferred embodiment of the apparatus in accordance with the invention;

FIG. 2 is a fragmentary bottom plan of a portion of the immersion walls of the apparatus shown in FIG. 1;

FIG. 3 is a plan view of a sieve insert; and

FIG. 4 is a plan view of the portion of the container which receives the sieve insert shown in FIG. 3.

The container 1 and cover 2 shown in the drawings are both made of light impermeable material. The container 1 preferably has a pouring lip 3. Connected to the bottom of the circular container 1 are annular partitions 4 and 5 and in the centre a partition 6, also annular, is provided above which is located the cover opening 7. Hence the internal space of the container is divided into the three annular sections 16, 17 and 18.

Immersion walls 8 and 9 made of transparent material are interconnected by ribs 10. These ribs 10 have cut-outs 11 by means of which they are mounted on the partition 5 so as to locate the walls 8 and 9 relative to the partitions 4 and 5. The sieve insert 12 with a handle 14 is made of a semitranslucent material and on its base a sieve 13 is provided. The partition 6 which surrounds the sieve insert 12 has an angled slot 15 formed therein, as particularly shown in FIG. 4.

The container 1 is partly filled with a saline solution suitable for breeding Nauplia, to such an extent that its surface assumes a level above the upper edge of the partitions 4 and 5, the lower edges of the immersion walls 8 and 9 being immersed in the liquid. The eggs placed into the annular section 16 are prevented by the immersion wall 8 from floating towards the centre of the container 1. Th sinking eggs are retained in sections 16 or 17 by the partitions 4 and 5. However, the hatched Nauplia swimming in the water can get over the partitions 4 and 5 to the centre, as they strive towards the light. They collect therefore, in the sieve insert 12 after passing through the slot 15 and may be removed therefrom in the sieve insert 12. The Nauplia are then washed in the sieve with fresh water and supplied as food to an aquarium.

I claim:

1. An apparatus for concentrating live fish food, comprising a container adapted to be partly filled with water and provided with a detachable cover having an opening therein, said container and said cover each being made of a light impermeable material and the container being internally divided into sections by partitions and immersion walls such that, when said cover is in position on said container, the opening in said cover is positioned above a section of the container which is required to receive light through said opening and which is separated from the remaining sections by said partitions and immersion walls.

2. An apparatus according to claim 1, wherein said partitions extend upwardly from the bottom of said container to a position below the intended water level, said immersion walls being offset from said partitions and arranged so as to extend from a position below said water level to a position above said water lever such that the water surface below the opening in said cover is separated from the remaining water surface.

3. An apparatus according to claim 1, wherein a removable sieve insert is arranged below the opening in said cover.

4. An apparatus according to claim 1, wherein a removabl sieve insert provided with a handle is inserted in said light-receiving section of the container, said light-receiving section being surrounded by an isolating partition and communicating with said remaining sections only via an isolating partition and communicating with said remaining sections only via an angled slot extending through said isolating partition.

5. An apparatus according to claim 1, wherein said immersion walls are interconnected by ribs which have cut-outs for engagement with at least one of said partitions for locating said immersion walls relative to said partitions.

6. An apparatus according to claim 1, wherein said container and said cover are circular and said partition and said immersion walls are arranged concentrically around the opening which is centrally arranged in said cover.

7. An apparatus according to claim 1, wherein said container is provided with a pouring lip.

References Cited
UNITED STATES PATENTS

| | | | |
|---|---|---|---|
| 2,804,045 | 8/1957 | Scott | 119—2 |
| 2,920,606 | 1/1960 | Anderson | 119—2 |
| 2,982,246 | 5/1961 | Kidder | 119—3 |
| 2,984,207 | 5/1961 | Drake | 119—2 |
| 2,990,808 | 7/1961 | Rumonski | 119—1 |
| 3,024,764 | 3/1962 | Brittain et al. | 119—3 |
| 3,086,497 | 4/1963 | Novello | 119—2 |
| 3,095,852 | 7/1963 | Goldman | 119—3 |
| 3,279,430 | 10/1966 | Mugridge | 119—3 |
| 3,304,645 | 2/1967 | Hardesty et al. | 43—55 |

ALDRICH F. MEDBERY, *Primary Examiner.*